July 20, 1965  L. A. ROSENTHAL  3,196,270
TREATING OF PLASTIC SURFACES
Filed July 31, 1962  2 Sheets-Sheet 1

INVENTOR.
LOUIS A. ROSENTHAL
BY
Walter C. Kehm
ATTORNEY

July 20, 1965 L. A. ROSENTHAL 3,196,270
TREATING OF PLASTIC SURFACES
Filed July 31, 1962 2 Sheets-Sheet 2
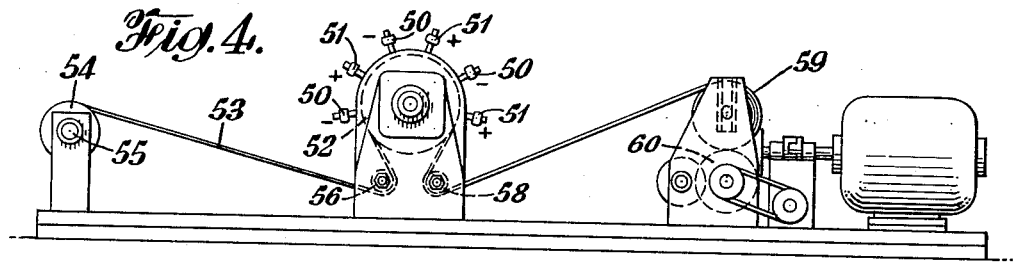
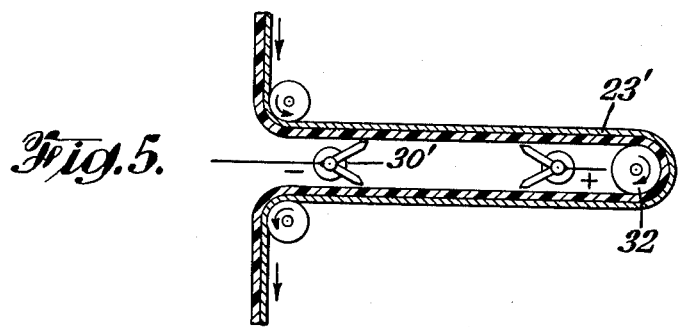
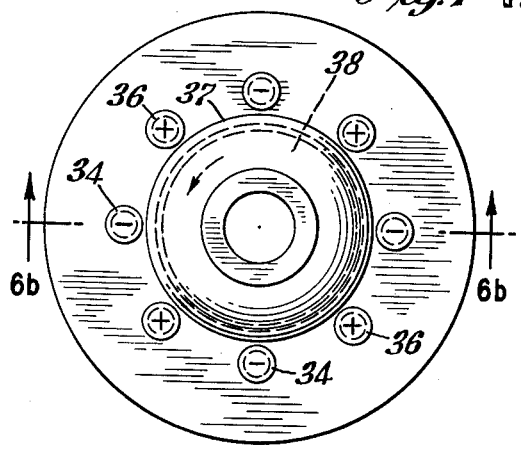
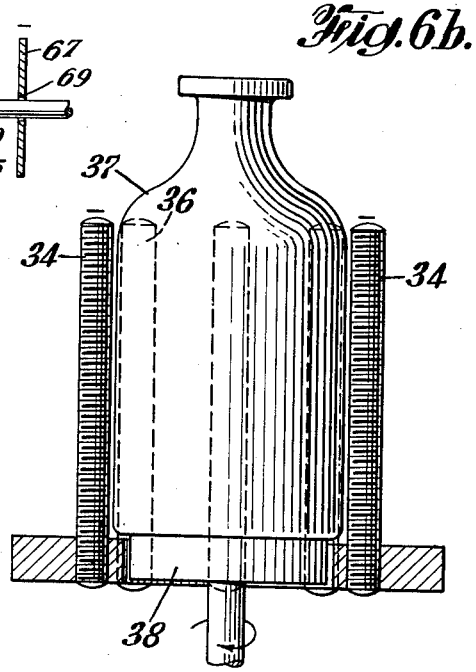
INVENTOR.
LOUIS A. ROSENTHAL
BY
Walter C. Kehm
ATTORNEY

United States Patent Office 3,196,270
Patented July 20, 1965

3,196,270
TREATING OF PLASTIC SURFACES
Louis A. Rosenthal, Highland Park, N.J., assignor to Union Carbide Corporation, a corporation of New York
Filed July 31, 1962, Ser. No. 213,745
12 Claims. (Cl. 250—49.5)

The present invention relates to the treating of plastic surfaces and more particularly to a method for improving the exposed surface adhesion qualities of films of plastic such as polyethylene for ink receptivity and adhesion of other dissimilar materials to the plastic surface.

The use of plastic films in sheet or film form as packaging materials is now well known and has wide application. Improvements in laminating, bonding and coating techniques have provided means and methods whereby such films may be printed with decorative matter or coated with thin films of other compositions to produce tough insulative decorative and moisture impervious wrappings having, in many applications, more advantageous features than plastic film alone. Most non-polar plastic film surfaces, however, are not ideally suited to the application thereon of other materials such as paints or inks. Polyethylene, for example, because of its non-polar surface properties, cannot be satisfactorily imprinted without some sort of treatment to render its surface more receptive and lastingly adhesive to printing ink. When, for example, untreated polyethylene film is imprinted with any of the known types of inks, the dried imprints do not adhere firmly to the polyethylene surface and can be removed with very little effort by slight abrasion or even fingernail scraping. This characteristic of poor receptivity to printing inks would, of course, present a serious disadvantage for plastic materials as wrappings whereon it is desired to imprint various indicia such as trademarks, recipes, advertising and the like and would seriously limit their application were it not for available treating methods.

Several methods and devices are available in the art for the treatment of plastic films to increase the plastic surface receptivity to inks and the like. See for example United States Patent No. 2,810,933, issued to R. F. Pierce et al. on October 29, 1957, and United States Patent No. 3,018,189, issued to G. W. Traver on January 23, 1962. In general, the known methods of plastic treatment to produce this effect comprehend subjecting the film to an alternating current high voltage electrical discharge established between two electrodes. The film is passed continuously through a relatively high voltage alternating current zone or a corona aura developed thereby. Exposure of the plastic film to such high voltage corona has no apparent effect on the strength, transparency, chemical inertness or other desirable characteristics of the film but does substantially improve its receptivity to inks and other coatings. While the precise mechanism of what occurs in or on the film is not fully understood, it has been believed that films so treated become slightly oxidized and thus exceptionally receptive to imprinting or further coating and that such imprints and coatings adhere very tenaciously to the film surface.

While such methods for improving surface adhesiveness are effective in treating plastic materials alone, the known electrical stress or corona discharge techniques have not been found ideally suitable for treating plastic film and coated substrates. For example, with the alternating corona discharge, the corona aura is developed only during the peaks of the sinusoidal voltage and the treatment is therefore intermittent and non-uniform. Also, with such pulsating or A.C. voltages, there is a very large capacitative or displacement current due to cyclic charging and discharging of the high voltage system. This results in a poor system power factor and large ohmic losses due to these large circulating currents. Such treatment has also been found to frequently cause pinholes through the material, thought to be occasioned by electrical short circuits through the conducting components of the film.

Also, with the alternating corona discharge, the corona aura is developed only during the peaks of the sinusoidal voltage and the treatment is therefore intermittent and non-uniform. As shown in the article by J. C. Von der Heide and H. L. Wilson, Modern Plastics, vol. 38, No. 9, pages 199–206 (May 1961) the alternating corona is developed only during about one-half of the total cycle. Efforts to maintain a continuous uninterrupting corona is impossible because of the changing polarity of the alternating voltage.

However, the changing polarity of the alternating current corona is the principal factor which makes the film treatment possible. All that is needed is two spaced apart electrodes for the generation of the corona with the film passed in between. The film, in contact with one electrode assumes the polarity of that electrode and permits the corona aura to be developed through the electrical discharge. However, where there is no alternating polarity of the electrodes, the thermoplastic film serves as an effective insulator and no corona is created. If the direct current voltage is increased sufficiently high to initiate corona aura between electrodes, the aura immediately ceases when the film is placed between the electrodes. If the applied voltage is subsequently increased in an attempt to recreate the corona, there is a danger of high voltage arcing and perforation of the film. Thus, direct current can not be used in the manner that alternating current corona is used.

Thus, heretofore, the disadvantages of alternating current corona have had to be suffered if this method of surface treatment is used.

Accordingly, it is a principal object of the present invention to provide a method and apparatus for treating plastic film to render the plastic film surfaces thereof more evenly receptive and retentive to imprinting or further coating thereon, by the use of a continuous corona aura.

It is a further object of the present invention to provide such a method and apparatus which comprehends efficient use of electrical energy required in the adhesive improving treatment of plastic film.

According to the present invention, it has now been discovered that a highly efficient and superior treatment can now be secured on polymer surfaces by subjecting a moving polymer surface to contact with a direct current corona discharge developed in an air gap between the polymer surface and a series of at least two continuous direct current coronas developed by at least two spaced elements of opposite polarity on the same side of the polymer surface to be treated. The corona is sustained by a direct current potential of sufficient magnitude applied to the elements to produce a continuous corona aura adjacent the polymer surface. Only by this technique is it now possible to prepare unperforated, evenly treated plastic films by the use of direct current corona aura. A better understanding of this invention can be secured from the attached drawings in which, FIGURE 1 is a schematic of the electrical and mechanical equipment for carrying out this invention;

FIGURE 4 is a schematic representation of a preferred embodiment utilizing a series of electrodes spaced about a large metal drum, each of which electrodes develop an aura between it and the film;

FIGURE 5 is a schematic representation of a further preferred embodiment utilizing a foil-backed film together with two oppositely charged electrodes lying next to the surface of the film;

FIGURES 6a and 6b are a schematic representation of a method for treatment of bottle surfaces with this technique, in which 6a is a top view of the elevation view 6b showing the bottle and spaced electrodes of opposite polarity; and FIGURE 7 is a sectional schematic representation of the treatment of polymer coated wire or cable.

In one embodiment of this invention there is provided apparatus for the treatment of polymer surfaces, such as film in supported or unsupported form, blown or molded objects such as bottles, rigid molded objects, tubing, coated metal wire, fibers and the like, comprising at least two spaced electrodes of opposing polarity arranged to be on the same side of the polymer surface to be treated, and spaced apart from each other to prevent arcing, and spaced apart from the polymer surface to be treated to provide an air gap therebetween, a current-conducting material on the reverse side of the polymer surface to be treated and in contact therewith, and electrically isolated from said electrodes, means for supplying direct current potential of high magnitude to said electrodes with each electrode being of opposite polarity to the next adjacent electrode, and means for moving said polymer surface whereby a direct current corona aura is developed in the air gap between the said electrodes and the polymer surface.

As another embodiment of this invention, there is provided a method for the continuous treatment of polymer surfaces to provide improved adhesion and printability to said surface which comprises moving a polymer surface through an electric field created between at least two spaced elements or electrodes of opposite polarity on the side of the polymer surface to be treated and a current-conducting material in contact with the reverse side of the polymer surface, said current-conducting material being electrically isolated from the said elements, as hereinafter described in detail.

Figure 1:
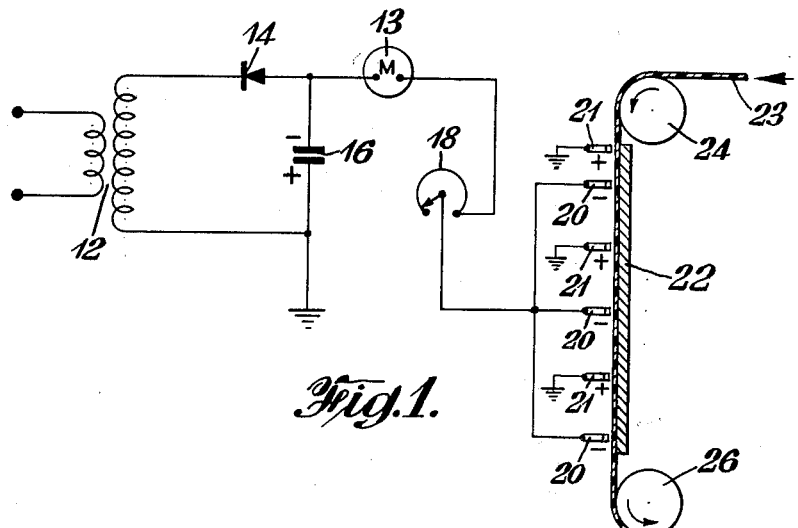

Referring now to FIGURE 1, which is typical of the preferred form for carrying out this invention, power is secured from any convenient source and preferably stepped up in voltage to a magnitude of 10,000–50,000 volts by an alternating current transformer 12 although any other means for securing such voltage under limited current can also be satisfactorily employed. The transformer should preferably have a high leakage reactance similar to a neon sign type of transformer so as to limit the current. The rectifier 14 can be a selenium stack-type rectifier, converting the alternating current to direct current, which is filtered by capacitor 16. Direct current meter 13 monitors and a series limiting resistor 18 limits the corona current to the desired value in conjunction with the leakage reactance of transformer 12. As shown, limiting resistor 18 can be a rheostat or it can be a group of different ohmage resistors which can be switched into or out of the circuit, or if desired, it can be a single permanent resistor. However, variable resistance is desired for most applications thereby permitting the limiting resistor to be varied depending on the nature of film being treated, the intensity of the treatment desired and the thickness of the polymer film.

Ordinarily this resistor 18 and transformer 12 is of a size sufficient to limit the corona current to about 1 to 20 milliamperes as measured through meter 13. Although the polarity of the applied voltage herein shown is grounded, i.e., positive, the polarity of the first electrode can be reversed if desired, if the initial static charge of the film is of the same polarity so that effectively a greater intensity of the corona can be created. The high direct current voltage is applied to each alternate electrode 20 shown here as a section of a hack saw blade which is close to the film 23 to be treated, with each intermediate electrode 21 being of the opposite polarity. Powered windup or rewind mechanism (not shown except as rolls 24 and 26) support the film or structure to be treated. The conductive plate 22 is of critical importance to develop the corona field and should be surfaced with a current conductive material, but it must be insulated or electrically isolated from the direct current power system. If one end of the power system is grounded as shown here, the plate 22 should be isolated and insulated. If instead both ends of the power system are isolated or insulated, then the plate 22 can be grounded to the machine.

In this type of treating apparatus, the corona does not develop on both sides of the film as it does with alternating current but is developed directly to the single charged side of the polymer surface at each of the electrodes 20 and 21. In no event does it go through the film as it does in alternating current corona. This feature creates the visible aura of the corona with an even purple glow developed at the points of the electrodes.

This feature insures surface treatment of only one side of the polymer surface with no treatment on the reverse side of the polymer. This "reverse-side treatment" often occurs with alternating current corona due to air-pockets under the film or unevenness of the back-up electrode of that technique. This "reverse-side treatment" creates off-setting during printing of the treated film, causing the ink from the printing to adhere to the reverse or non-printed side of polymer film laid on newly printed surfaces. This does not happen with the process of this invention.

However, one of the most distinguishing features of the treatment of the polymer surface with this invention is that the intensity of the corona aura is increased with an increase in the linear speed of the plastic surface. At high speeds the corona aura is quite intense but still is free from streamers, sparks or static discharge which are so prevalent with alternating corona. Similarly, the audible noise and little radio frequency static associated with the treatment of this invention is not objectionable and is easily contained by suitable enclosures, if desired. A further distinct advantage connected therewith is that when the polymer surface is stationary the corona aura terminates and disappears. Thus, in continuous treatment of polymer films, the film can be stopped without shutting off the power system. The corona is extinguished as the film stops but without damage or danger to the film. In alternating corona treatment, the aura would continue and, even in a short period of time, would burn through and perforate the film.

Figure 2:
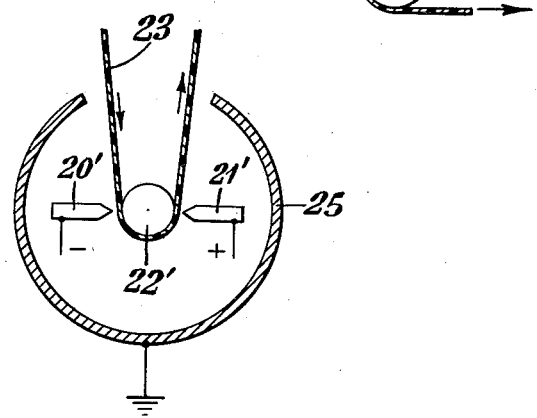
FIGURE 2 is a schematic representation of one embodiment of the treating electrode apparatus herein contemplated.

While many different electrodes can be employed in this invention, it is necessary that the electrodes 20 and 21 have a small radius of curvature or composed of a sharp edge or a series of sharp points to provide a high voltage gradient across the space where the corona aura is to be developed. An ideal electrode is illustrated in FIGURES 1 and 2 as a section of a hack saw blade wherein the teeth of the blade serve as the sharp points or in FIGURE 3 wherein a metal fiber brush serves as the sharp points for corona aura development or by any other physical configuration having sharp points or edges for the development of a high voltage gradient between the electrodes and the current conducting backing plate, as for example, knife edges, threaded screws, and the like. All are suitable.

The backing member or plate must have a current conducting surface and preferably is metal or other similar conductive material. It is quite critical that the reverse side of the polymer surface be in direct contact with the current conducting surface, and the conducting surface must also be electrically isolated or insulated from the power system employed on the electrodes. Otherwise its configuration is not narrowly critical. It can for instance be a flat metal plate on which the polymer surface slides or it can be a metal or metal-coated roll. Similarly it can be a metal foil laminated to the polymer surface and even serve as the support for such polymer surface, or it can be a metal wire or cable having a polymer coating thereon. It may also be an electrolyte solution of high conductivity or a thin vacuum deposited metallic coating on the polymer surface. Conducting rubber or plastic compositions may also be used. Any of such current conducting surfaces as can be envisioned by those skilled in the art are acceptable for use in the instant invention.

This surface of a current conductive material on the backing member has been found to be a highly important aspect of direct current corona generation. High electric fields accelerate the free electrons in air (which are always present due to ionizing influences such as ultra violet and cosmic radiation) causing them to ionize the air thus providing a brush or spray discharge. This discharge is uniform over the high field potential regions. However, it is not always stable for if an electron which is accelerated were to strike a metallic electrode of opposite polarity and release some secondary electrons, these secondary electrons increase the local intensity to a point where heating accelerates electron emission. This then becomes a run-away phenomenon and the corona turns into a spark which terminates on the local hot spot of a metallic electrode. Sparking with direct current destroys the corona field by reducing the voltage gradient to less than that sufficient to keep the air ionized. Therefore, an electrically isolated backing member prevents arcing and hot spots to the film and ultimate perforation. There is substantially no heat buildup in this surface treatment which could shrink or ripple oriented film.

An alternate electrode configuration is shown in FIGURE 2. The structure here is shown with an insulated metal roll 22 with a uniform corona developed in the air gap between the film 23 and each of the opposite polarity electrodes 20' and 21' shown here as composed of sharp knife blades or hack saw blades. The film 23 enters the system through a slot in shield 25 and passes over the inner backing member 22 which preferably is made as a metal roll or other suitable rotating mechanism having a current conducting surface.

Figure 3:
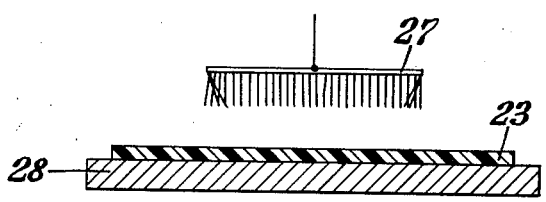
FIGURE 3 is a schematic representation of a brush electrode also contemplated in this invention.

In FIGURE 3 a further embodiment of the invention is shown in which a brush electrode 27 supplies the high electric field for the corona generation. The film 23 passes over flat current conducting plate 28 which can be of metal or other such conducting material. In this design the corona aura develops in the air gap between the brush electrode 27 and the film 23 resting on current conducting plate 28 only when the film is moving.

FIGURE 4 illustrates a preferred embodiment of the invention in which a number of electrodes of alternate polarity 50 and 51 are spaced equidistantly about the periphery of a large rotating drum 52. While shown here with six electrodes, three of each polarity, a greater or lesser number can be provided as desired. They should be spaced sufficiently apart to prevent high voltage breakdown between these electrodes. Drum 52 preferably is a metal drum insulated from the power supply (not shown) or it can be of a plastic or insulating material surfaced with metal and finished to a smooth surface for intimate contact with film 53 to be treated. Film is unwound from supply roll 54 which is unpowered but equipped with a friction drag 55, around idler roll 56 around the drum and removed by idler roll 58 and wound on take-up roll 59. The linear speed of the film is maintained constant by friction drive roll 60 operating at a constant speed set about five percent faster than the drive to treating drum 52 so as to maintain constant tension on the film.

The linear speed of the film is established commensurate with the number of electrodes spaced about the drum so as to give the desired degree of treatment, or conversely, the number of electrodes can be increased or decreased with a fixed speed of the drum to give desired results.

FIGURE 5 represents a still further preferred embodiment in which one single group of electrodes is able to treat twice the same side of polyethylene coated aluminum foil. The two electrodes 30 and 32 shown are short sections of hack saw blades to give sharp points for the development of the corona aura close to the surface of the film 23' and the aluminum film backing serves as the conducting member.

FIGURE 6a represents a top view and 6b a sectional view of a modification for the treatment of round plastic bottles and other such formed objects. Stationary alternating electrodes 34 and 36 of sections of threaded rod provide the corona aura to the plastic bottle surface 37 and any number of such electrodes may be so provided. Rotating table 38 spins the bottle so as to get surface treatment on the entire peripheral surface of the bottle. The bottle can be filled with an electrolyte solution or metal powder or shot to provide for current conduction.

FIGURE 7 represents a sectional view of the embodiment of this invention in which a metal cored element or conductor 61, which has been coated with polymer 63 is passed through a plurality of elements 65 and 67 which are impressed with opposing D.C. polarity of sufficient magnitude to create the direct current corona in the air gap 69 between the elements 65 and 67 and the polymer surface 63. Elements 65 and 67 can be of any desired configuration but are shown here as discs or washer shaped elements through which the polymer coated wire passes, and are connected to opposing polarities of the direct current power system and the wire 61 remains electrically isolated from the power system.

In the practice of this invention the air gap between the sharp electrode and the plastic surface, in which the corona aura is developed is not narrowly critical. Inasmuch as the apparent intensity of the electric field generating the corona is a factor of the distance from the surface, it is preferred to have the electrodes as close to the plastic surface as possible, i.e. about ⅛ to ⅟₆₄ inch, although effective corona is developed at much greater distances, even up to one inch or more. At the closer distances, the plastic surface is within the more intense area of the corona aura and it appears that a more effective treatment during a shorter period of time should result.

By the practice of the present invention, it is now possible to get continuous and even surface treatment on the plastic. In generating a corona discharge by alternating current, for example, the sinusoidal or pulsating voltage creates the corona only during the time when the required electric field is achieved. Thus, corona is observed only during the peaks of the applied wave form. This is intermittent and polarity continually reverses with this. The former creates unevenness of treatment whereas the latter contributes to result in a poor system power factor and large ohmic losses due to cyclic charging and discharging of the high voltage system.

The method of this invention can be applied to unsupported or supported surfaces of plastic of any kind, with significant results being secured with films. Highly desirable results are also secured with polymer coated metal foils, wire and cables in which the foil, wire or cable itself serves as the current conducting medium. It is likewise possible to employ the invention on molded or extruded objects of various shapes such as on bottles, pipes, fibers and the like. Adaptation of this invention can easily be made to an extruder so as to treat the extruded polymer immediately after extrusion and cooling. Particularly, it is adaptable to film formation by chill roll extrusion techniques wherein a polymer film is extruded directly on a rotating cold metal roll which then passes the film under a series of the opposing polarity electrodes. The cooling roll itself then serves as the current-conducting member and effective treatment is secured in basically one operation. However, if desired, it is of course possible to directly treat preformed film made by the tubular extrusion or bubble techniques by a similar adaptation of that technique.

The following examples are illustrative of this invention and are not to be deemed to be controlling thereof.

*Example 1*

The equipment employed in this example consisted of a direct current power source adjustable from 0 to 30,000 volts and a maximum current of 20 milliamps (ma.). A series of 6 inch lengths of hack saw blade served as the electrodes with each alternating blade being of the opposite polarity to that of the next adjacent blade. The electrodes were placed above an ungrounded 1/8 inch aluminum sheet serving as the backing member. A corona aura developed very readily between the saw blade and the aluminum sheet at an applied voltage of 17,000 volts with the saw blade about 1 inch above the plate. The corona was maintained as a bright purple glow at 19,000 volts and 1 ma. The power level at this voltage was only 19 watts and the corona aura was cold.

A 6 inch wide strip of polyethylene film about 1 mil thick interposed between the saw blades and the aluminum sheet terminated the corona aura developed as above. Upon moving the polyethylene film uniformly through the dielectric field by a wind up mechanism causes the corona aura to be recreated as long as the film is kept moving. The corona is remarkably uniform in color, free of streamers, sparks and hot spots. Exposure of the film to the corona aura gave effective ink reception to the film as evidenced by coating the film with a commercial lithographic ink and drying the ink film. Adhesion was determined by a "Scotch Tape Test" which consisted of a short piece of commercial cellulose based adhesive tape firmly placed on the ink film and then stripped off. Excellent adhesion was determined when the tape could pull little or no ink off the coated film. Poor adhesion was determined when the tape pulled all or a great portion of the ink off the coated film.

*Example 2*

An apparatus consisting of a metal roller 1 inch in diameter powered by a variable speed drive was mounted on a wood platform to electrically isolate the roll from the power supply. Two 2-inch sections of a hack-saw blade were mounted 90° apart on the periphery of the roll with the cutting edge of the blade about one-eighth inch from the surface, each electrode being connected to opposing leads of a 20,000 volt power supply. A roll of 6-inch wide, 1-mil polyethylene film was threaded over and making a loop about the roll.

At about 17,000 volts and 1 ma., a corona aura was developed between each electrode and the film, when the film had a linear speed of about 90 feet per minute. As the speed of the film was increased, the intensity of the aura was increased with the corona current increasing significantly. Stopping the film terminated the corona which immediately restarts as the film speed increases. The corona aura was a clear purple glow, free of streamers and sparks. After being treated in accordance with the method of this invention, the polyethylene surface of the material has no pinholes or other defects and excellent ink adhesion obtained in imprinting tests.

*Example 3*

Employing the apparatus essentially as described in FIGURE 4 with a 6-inch wide, 6-inch diameter treating drum, a 6-inch wide sheet of polyethylene film was continuously treated at a linear speed of 50 feet per minute. The effective power was only 34 watts using 17,000 volts and 2 ma. current. Increasing the speed to 100 feet per minute increased the current to 4 ma. at the same voltage, whereas stopping the film travel terminated the corona without damage to the film.

Application of printing ink to the treated surface gave excellent adhesion to that surface whereas no "reverse side treatment" was evident as determined by the "Scotch" adhesive tape test heretofore described.

Completely equivalent results are secured with unsupported films of polyethylene, polypropylene, polystyrene and other equivalent polymer films, blow molded or injection molded articles; the beneficial results being secured because of the continuous current-limited direct current voltage corona. When conventional alternating current treating methods involving two spaced treating electrodes and passage of the plastic film between them were employed on similar materials, burned-through points and erratic surface adhesion improvement occurred at low power levels. Higher power levels produced burned holes through the material. It appeared that arcs struck through the polyethylene which burned right through the film.

Thus, while described herein as having great potentials for the treatment of non-polar polyolefin surfaces to provide improved adhesion of coatings, the process of this invention is useful for the treatment of any polymer surface, be it thermoplastic or thermosetting in nature. Polyethylene in particular always requires surface modification or treatment such as herein provided to permit any dissimilar coating to adhere thereon. Polypropylene surfaces when so treated not only permit dissimilar coatings to better adhere thereto but also provides for easier adhesion to itself and at lower temperatures. This treatment thus facilitates the heat sealing of such treated polypropylene films at low temperature and thus prevents shrinkage of oriented films. This improved adhesion of polypropylene to itself is also equated to the improved adhesion of other coatings and imprintations.

In the use of the treated films produced hereby, the improved results are secured when the polymer surface is coated completely or partially with any coating, be it a flexographic printing ink, a barrier coating such as moisture vapor or oxygen barrier coatings of epoxy, vinyl or vinylidene halide polymers, phenolic resin or other similar polymers, resins or other dissimilar materials normally applied to such treated surfaces. Such subsequent coating or imprintation can immediately follow the treatment as set forth hereinabove, or may take place at any time thereafter since the surface treatment is permanent.

While, in the foregoing description, certain specific details and operative steps have been set forth, variations may be made in these without departing from the spirit of the present invention. The selection and application of numerous equivalents, which, combined, will comprise apparatus according to my invention and whereby the method of this invention may be practiced, will undoubtedly be suggested by our description to persons skilled in the art. The foregoing description therefore has been given for clearness of understanding only, and no unnecessary limitations should be understood therefrom except as hereinafter specifically recited in the appended claims.

It should be specifically reiterated that while the development of a direct current corona aura is critical in the practice of this invention, the applied potential to the electrodes need be only that potential of such magnitude as is necessary for the corona development. Normally a corona aura will develop at a voltage potential of about 15–17,000 volts in air, readily ionizable gases may be employed in conjunction so as to lower the required potential necessary. Naturally, greater voltage potentials may be employed if desired although generally such are not necessary.

What is claimed is:

1. A method for the treatment of polymer surfaces which comprises exposing one side of a polymer surface to corona aura of a series of opposite polarity direct current corona on said side sustained by direct current potential of sufficient magnitude to produce a continuous aura adjacent the polymer surface.

2. A method for the treatment of polymer surfaces which comprises subjecting a moving polymer surface to a series of direct current corona aura developed in an air gap between the moving polymer surface and at least two spaced elements of opposite direct current polarity of sufficient magnitude to produce a continuous corona aura.

3. A method for the continuous treatment of moving polymer surfaces which comprises moving a polymer surface through a direct current corona aura while supporting said polymer surface with a current conducting material in intimate contact with the reverse side of the polymer surface to be treated and electrically isolated from the direct current source applied to the corona generating elements, said elements having sufficient applied direct current potential to create a corona aura between the said elements and the moving polymer surface.

4. A method for the continuous treatment of thermoplastic film which comprises passing a self-sustaining unsupported thermoplastic film through a high voltage electric field created between a plurality of spaced elements and a current-conducting material, said current-conducting material supporting and being in intimate contact with the side of the polymer surface opposite the surface to be treated and electrically isolated from the said spaced elements, said elements being of opposite polarity of the next adjacent element, and having sufficient applied direct current potential to create a direct current corona aura between said elements and the moving polymer film.

5. A method according to claim 4 wherein the film is polyethylene.

6. A method for the treatment of polymer covered metal foil which comprises continuously passing said polymer coated foil through a direct current corona aura maintained in an air gap between at least two elements of opposite polarity and the polymer coating on the metal foil, the foil being maintained electrically isolated from the direct current corona inducing polarities.

7. A method according to claim 6 wherein the polymer coating is polyethylene.

8. A method for the treatment of a metal cored polymer coated element which comprises continuously passing said metal cored element through a plurality of elements of opposite polarity while maintaining a direct current corona aura between said elements and the polymer surface, the metal core being maintained electrically isolated from the said elements.

9. A method according to claim 8 wherein the polymer coating is polyethylene.

10. An apparatus for the treatment of polymer surfaces which comprises at least two spaced electrodes of opposite direct current polarity, spaced apart from the polymer surface to be treated to provide an air gap therebetween, a current-conducting material on the reverse side of the polymer surface and in intimate contact therewith and electrically isolated from said spaced electrodes, means for supplying direct current potential of high magnitude to said spaced electrodes and means for moving said polymer surface in close relation to said electrodes whereby a direct current corona aura is developed in the air gap between said electrodes and the moving polymer surface.

11. An apparatus for the treatment of polymer surfaces which comprises at least two spaced electrodes provided with projections of small radius of curvature thereon spaced apart from each other and spaced apart from the polymer surface to be treated to provide an air gap therebetween, a current-conducting material on the reverse side of the polymer surface to be treated, and in intimate contact therewith, and electrically isolated from said electrodes, means for supplying direct current potential of high magnitude to said electrodes with each electrode being of opposite direct current polarity to the next adjacent electrode, and means for moving said polymer surface in close relation to said electrodes whereby a direct current corona aura is developed in the air gap between the said electrodes and the moving polymer surface.

12. An apparatus for the treatment of polymer surfaces which comprises a metal-surfaced rotatable cylinder, a plurality of spaced electrodes provided with projections of small radius of curvature spaced apart from said rotatable cylinder to provide an air gap therebetween and electrically isolated therefrom, means for continuously passing a self-sustaining polymer film over said rotatable cylinder and in intimate contact therewith, and through the air gap between said electrodes and said rotatable cylinder, means for supplying direct current potential of high magnitude to said spaced electrodes with each electrode being of opposite direct current polarity to the next adjacent electrode, whereby a direct current corona aura is developed between the air gap between the said electrodes and the moving polymer surface.

References Cited by the Examiner

UNITED STATES PATENTS

| | | | |
|---|---|---|---|
| 2,642,000 | 6/53 | Wieking | 34—1 |
| 2,864,756 | 12/58 | Rothacker | 250—49.5 X |
| 2,939,956 | 6/60 | Parks | 250—49.5 |

FOREIGN PATENTS 765,545  1/57  Great Britain.

RALPH G. NILSON, *Primary Examiner.*